H. W. JOHNSON.
APPARATUS FOR SEALING VESSELS.
APPLICATION FILED MAR. 26, 1917.

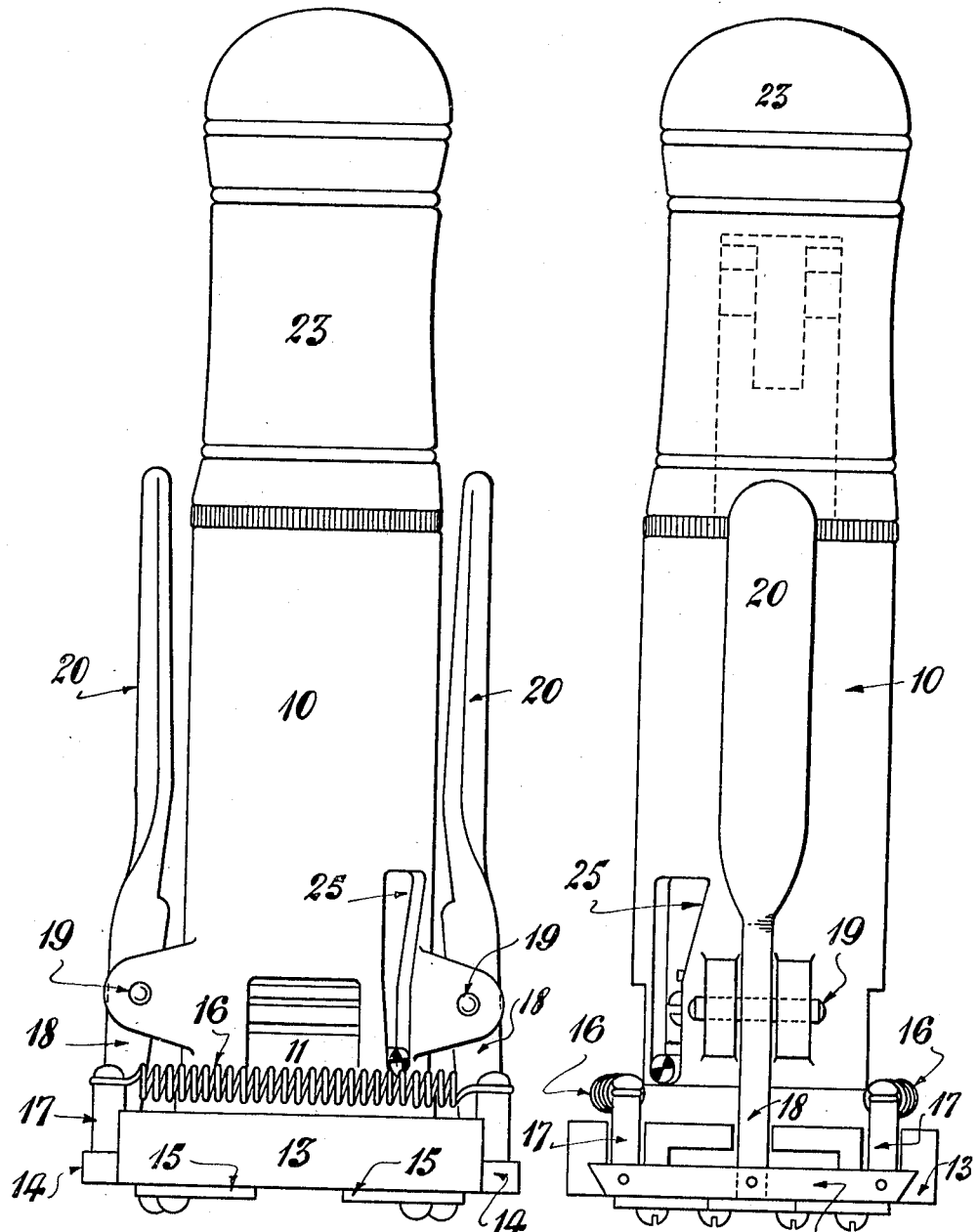

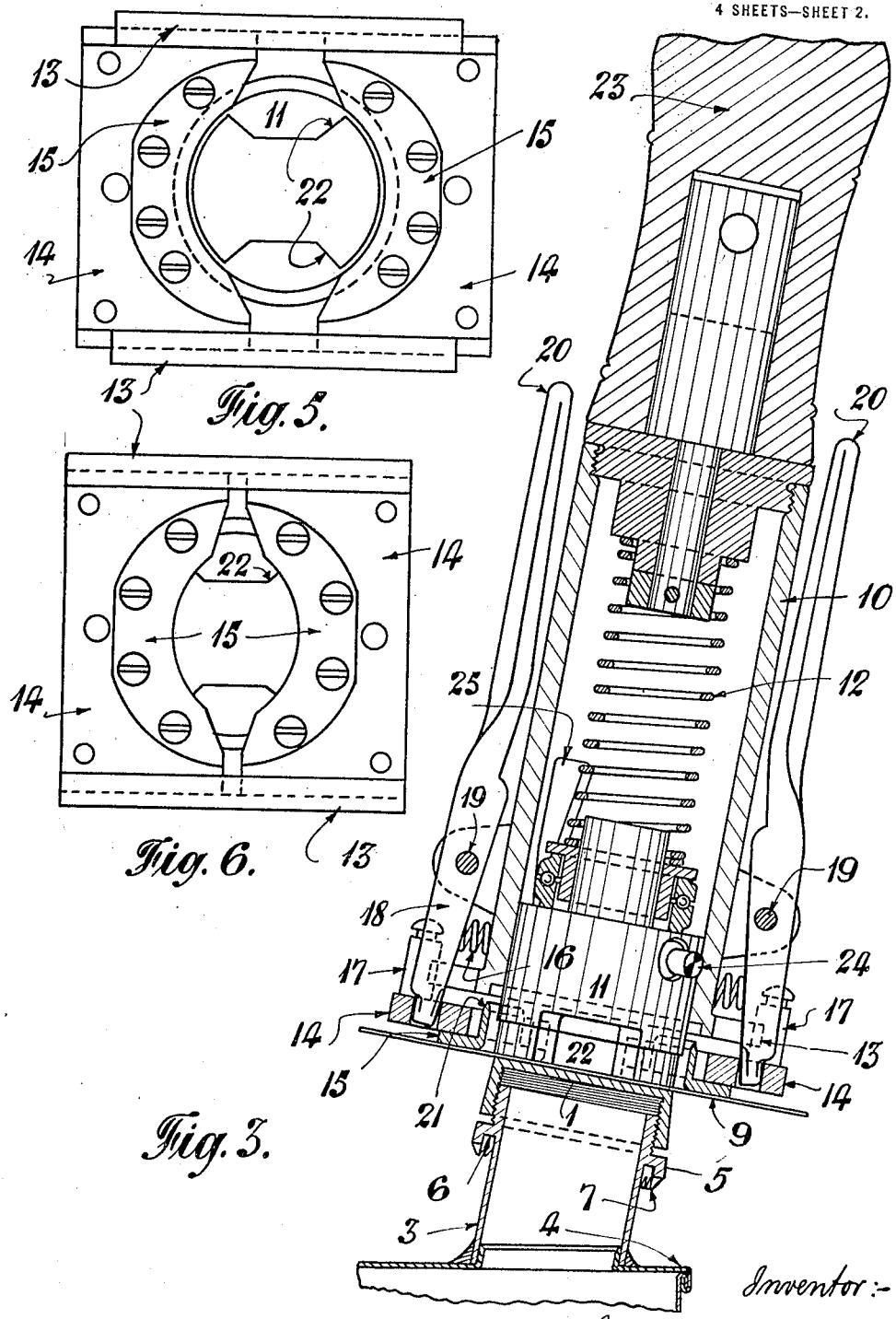

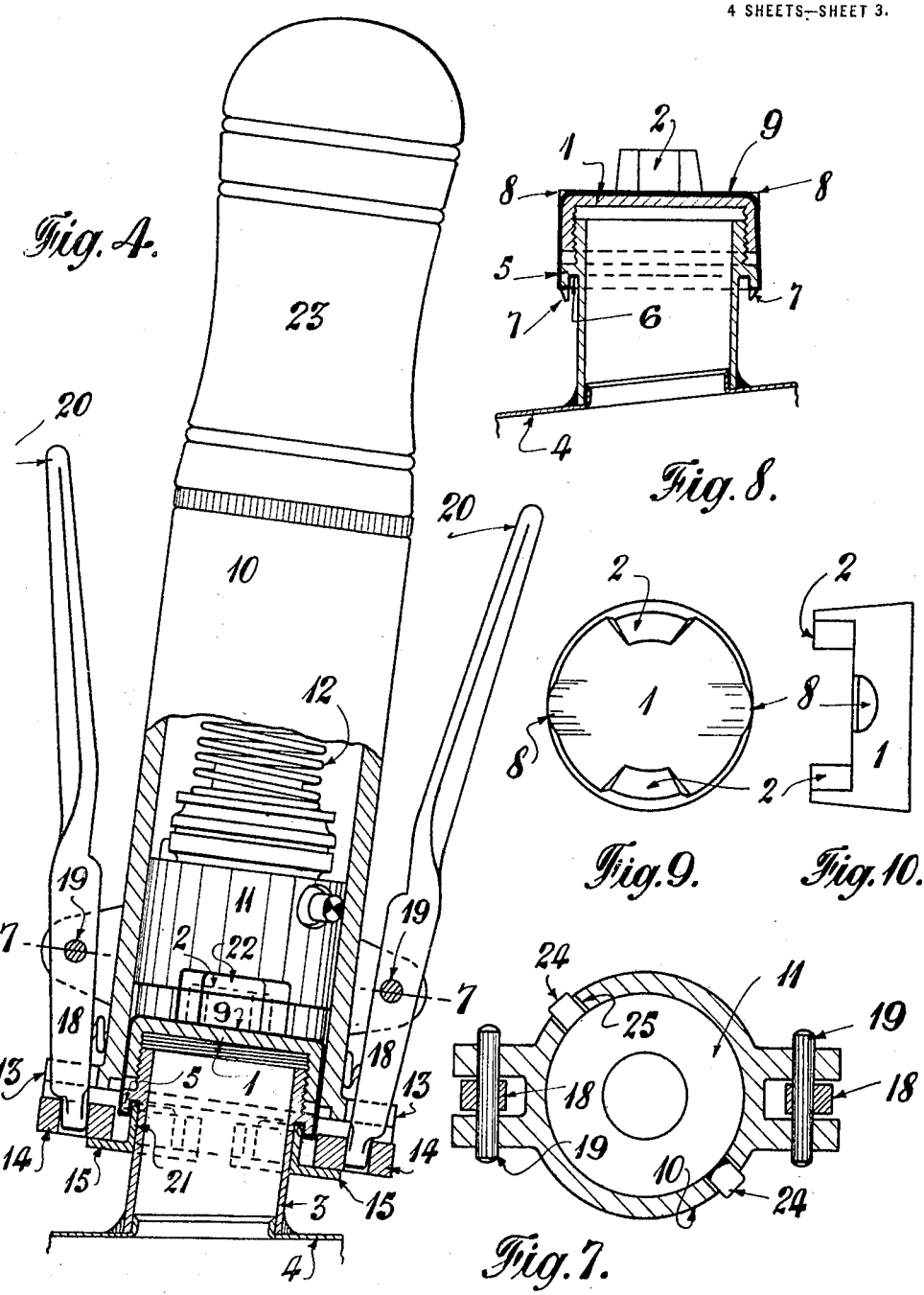

1,298,218.

Patented Mar. 25, 1919.
4 SHEETS—SHEET 4.

Inventor:-
Harry Wilday Johnson.
By his Attorney:- Walter Gunn

UNITED STATES PATENT OFFICE.

HARRY WILDAY JOHNSON, OF ATHERTON, ENGLAND.

APPARATUS FOR SEALING VESSELS.

1,298,218.   Specification of Letters Patent.   Patented Mar. 25, 1919.

Application filed March 26, 1917. Serial No. 157,496.

*To all whom it may concern:*

Be it known that I, HARRY WILDAY JOHNSON, a subject of the King of Great Britain and Ireland, and resident of Atherton, Lancashire, England, have invented certain new and useful Improvements in Apparatus for Sealing Vessels, of which the following is a specification.

This invention relates to apparatus for sealing petrol tins and other stoppered vessels.

Containers of the kind referred to are usually provided with a screwed stopper having projections thereon for manipulating purposes, and the main object of the present invention is to provide a seal which can be applied to the stopper regardless of the angular position of the same relative to the neck, and which will be effective to prevent the slightest relative movement, without destroying the seal. Another object of the invention is to provide simple means for applying the seal to the container. A still further object is to simultaneously record upon the vessel any desired information, such as the brand of the contents, make, or date, as the sealing takes place. According to the invention the neck of the vessel is provided with an overhanging flange or rim on the underside of which is formed an undercut recess or groove of an inverted channel or U-shape in cross section. The seal, which preferably consists of a comparatively broad ribbon of soft metal, is placed across the stopper, after the latter is home, and is bent over at the edges. Said edges are suitably notched or shaped to receive the seal and accommodate the same when bent and also to prevent relative movement. The ends or outer parts of the seal are then bent around the before mentioned undercut rim. If desired, the edges and undersides of the rim may be notched or formed with sharp projections or teeth of any desired contour or pitch on to which the seal ends are driven, so that immediately the stopper is moved in any direction, the seal is torn. The rim may be formed on, or secured to, the neck of the vessel, or may be revolubly mounted thereon, and instead of a rim, recesses having similar undercut inverted channel, or U-shaped grooves, may be formed in the neck itself.

A convenient device for applying the seal comprises a fitting into which the neck of the vessel, with the stopper in position can pass through an opening in the lower end thereof. Sliding members, of which two or more may be used, are mounted on the fitting and are adapted to close radially around the neck of the vessel. Upon the top sides of the sliding members are projecting ridges adapted to enter below the undercut rim in a manner to be hereinafter explained.

A spring-pressed die or plunger, which is suitably shaped to engage the stopper, is mounted in the fitting. The arrangement is such that after a seal has been placed on a stopper and the neck of the vessel passed into the device, with the sliding members embracing the same, the action of the spring, acting between the top of the device and the stopper is sufficiently strong to slide the device bodily along on the neck and force the ends of the seal under the rim and into engagement with the before-mentioned projections.

If desired, the before-mentioned projecting ridges may be formed as knife edges, in which case provision is made to impart a part rotary movement to said ridges, or knives, in order to sever the ends of the seal projecting beyond the edges of the knives when in the final position.

Suitable manipulating handles are provided to withdraw the sliding members.

The device may be mounted upon a manipulating lever beneath which the vessels to be sealed are fed.

The plunger or die may be inscribed with any desired information which it may be desired to record upon the seal and the latter may, if desired, be used in the form of a long strip or reel, mounted on the device. The seals in this latter case are automatically fed to the stopper and the required length cut off, suitable shears or knives being provided for the purpose and interconnected with the moving elements so as to be operated synchronously therewith. The seal is preferably in the form of a comparatively broad ribbon.

The invention will be more particularly described by the aid of the accompanying drawings, in which:

Figure 1 is a front elevation of a machine constructed according to the invention.

Fig. 2 is a side view of Fig. 1.

Fig. 3 is a sectional elevation of the machine shown in position to commence sealing.

Fig. 4 is a view corresponding to Fig. 3, but showing the disposition of the parts after the sealing operation.

Fig. 5 is an inverted plan of Figs. 2 and 3.

Fig. 6 is an inverted plan of the jaws in the position shown in Fig. 4.

Fig. 7 is a sectional plan view on the line 7, 7 of Fig. 4.

Fig. 8 is a sectional elevation of a stopper attached with a seal in position.

Fig. 9 is a plan view, and

Figures 11, 12:
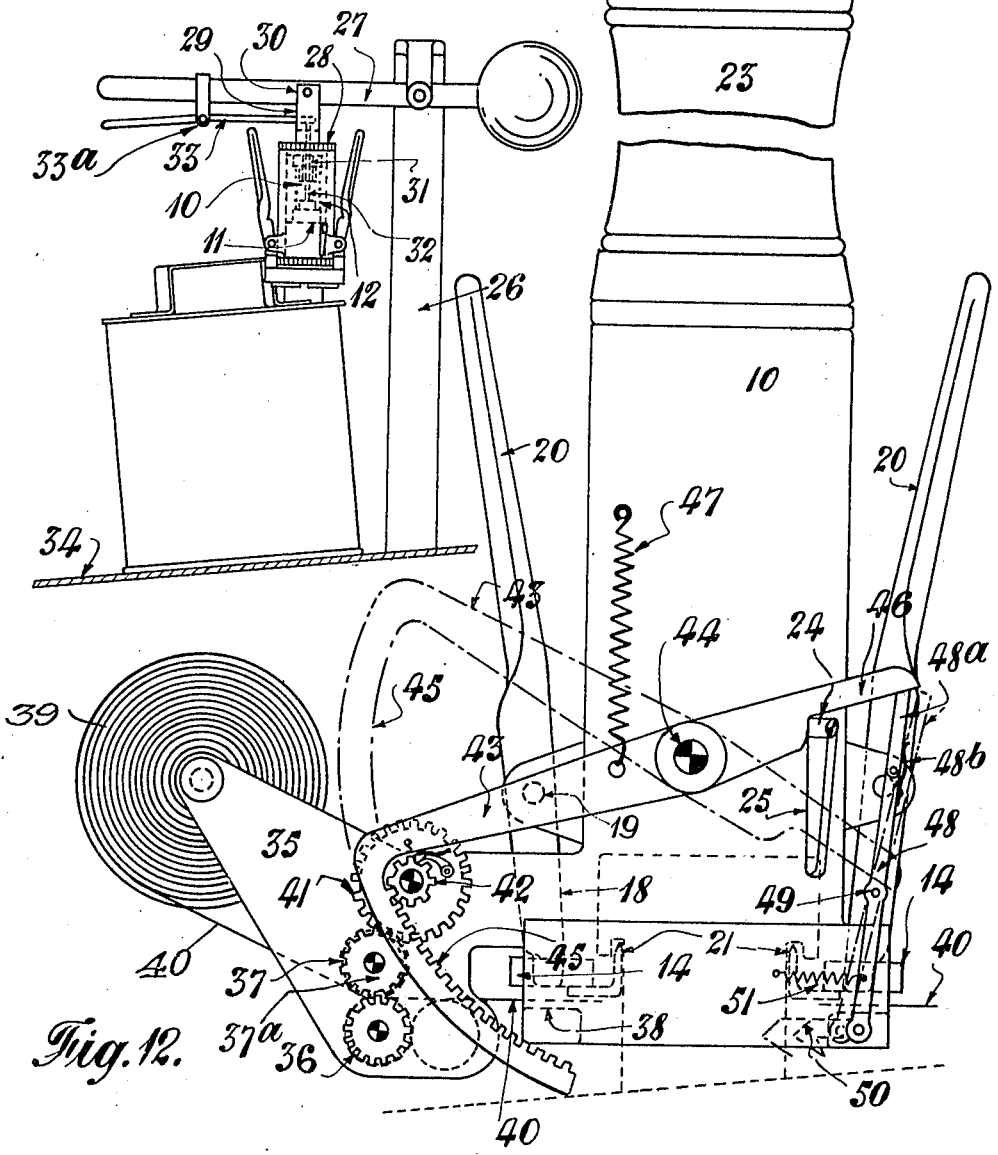

Fig. 10 a side view in detail of the stopper.

Fig. 11 shows the invention applied to a machine in which the tins are automatically fed to the sealing device, only such parts of the machine being shown as are necessary to explain the present invention.

Fig. 12 illustrates diagrammatically a modification in which the sealing strip is automatically fed into position.

The invention will now be described with reference to Figs. 1 to 10 in connection with a petrol tin and a portable, manually operated sealing device. Petrol tins are usually provided with screwed stoppers 1, as shown more particularly in Figs. 8 to 10, the top portions of which are circular in plan, diametrically opposite projections 2, 2 standing up from the top surface to provide abutments for a bar or other tool, by means of which the stopper may be rotated.

The neck 3 of the tin 4 according to this invention, is provided with an all round rim 5 having an undercut recess 6, which forms a flange, the lower edge 7 of which is serrated or notched, and, if desired, the inner surface of the recess also may be provided with projections. A standard size of stopper for such tins is about one and five-eighths inches in diameter. The top edge of the stopper is formed with two diametrically opposite notches 8, 8 slightly less in width than the width of the seal 9, the latter preferably being of the before-mentioned ribbon form and about five-eighths of an inch in width for a stopper of the size described. The notches 8, 8 are so shaped that, when the seal is bent over the same, it beds tightly therein, notwithstanding that the stopper is circular while the ribbon 9 where bent is straight. The ends of the seal are bent over the rim 5 and the extreme ends are forced into the undercut recess 6 in the same. Where the edge of the rim or interior of the recess is provided with serrations or projections, the ends of the seal are forced into engagement with such projections so that it is impossible to turn the stopper in either direction without tearing the seal.

The seal is clamped in position by means of a device comprising a hollow cylindrical fitting 10 having an internal die or plunger 11 held on the top of the seal by means of a spring 12, normally acting to force the plunger 11 outwardly.

The lower end of the cylinder 10 is open, and slidably mounted in guides 13, 13 on the lower face, are two members 14, 14 provided with fittings 15, 15 which are shaped to fit the neck of the tin 4 and which are normally urged toward each other by springs 16, 16 carried on suitable projections 17, 17 or the like. The sliding members 14, 14 are provided with levers 18, 18 which are pivotally connected at 19, 19 to the cylindrical fitting 10, and by means of which when the handles 20, 20 are pressed inwardly, said members 14, 14 may be retracted; the inner edges of the fittings 15 are formed with projections 21, 21 which are adapted to enter the undercut recess 6 in use, and as shown, the top edge of said projections are formed with knife edges to sever the surplus ends of the seal, as hereinafter explained.

The face of the die is formed with recesses 22, 22 to receive the ears or projections 2, 2 on the stopper and is embossed or otherwise inscribed with any matter (such as the brand, date or maker of the contents) which it may be desired to impress upon the seal, or if desired the seal may be embossed before being fixed.

In use the sliding members are retracted, by forcing the lever handles 20, 20 inwardly when the plunger 11 is urged, by its spring 12 in between the members 14, 14 and keeps said members apart. A straight seal 9, see Fig. 3, is placed across a stopper 1 (which has been screwed home) so as to engage the notches 8, 8 therein, the ends of said seal usually being turned down by the operator. The device is placed upon the stopper with the central die 11 in contact with the same and sufficient pressure applied to the handle 23 to cause the die to recede. Immediately the die 11 is pushed out of engagement with the sliding members 14, 14, the latter advance toward each other until they close on to the turned down ends of the seal and meet the sides of the stopper. The downward movement of the device is continued until the sliding members have passed under the rim and gripped the neck of the vessel at the same time carrying the ends of the seal with them. When the external pressure is removed the die spring 12, being in tension, acts between the die 11, which is positioned by the stopper and the top of the device, the result being that the cylindrical fitting and connected parts are raised bodily and the projections 21, 21 on the top face of the sliding members 14, 14 force the ends of the seal into the undercut recess 6 and into engagement with the projections 7 on the rim, as seen in Fig. 4, said projections being formed knife edged for a purpose hereinafter explained. To remove the device, the handle 23 is first pressed downward until the projections 21, 21 on the sliding members are clear of the rim 5 of the tin neck 3 when they are retraced by their levers 18, 18 as before explained, and the spring plunger 11 is effective to eject the stoppered neck and advance into a position to retain said sliding members 14, 14 open ready for use on the next stopper as shown in Fig. 3.

In order to sever the surplus ends of the seal provision is made to rotate the fitting 10 and superimposed parts independently of the plunger 11, thereby aiding the cutting action of the knife-edged projections 21, 21. Said plunger 11 is provided with projections 24, 24 sliding in slots 25, 25 in the casing 10 to limit the independent axial movement of said plunger and casing. The slots 25, 25 are wider at the top than at the bottom and one of the edges of each slot is parallel to the axis of the plunger, while the other is inclined, the arrangement being such that as the fitting 10 is forced downward no rotary movement, relative to the plunger, takes place. When, however, the sealing has been effected and the parts are in the position shown in Fig. 4, the projections 24, 24 lie at the wide ends of the slots 25, 25 and a part rotary movement can be imparted to the fitting 10 independently of the plunger 11, so that the surplus ends of the seal are effectively cut off. When the fitting is removed from the stopper as before described the plunger is automatically turned backward as it is forced downward, or outward, by the spring 12, owing to the projections 24, 24 engaging the inclined sides of the slots 25, 25. To facilitate the relative rotational movement a ball-bearing washer is placed between the spring 12 and the top of the plunger 11.

The device may be self-contained as above described, or may be mounted on a stand and adapted to be operated manually or by power. In Fig. 11 the device previously described is shown mounted on a stand 26, to which it is pivotally connected by a weighted lever 27. The cylindrical fitting 10 is provided with a screwed top 28 to which is connected a fitting 29 having ears 30, 30 for connection to the lever 27. An extension 31 of the fitting 29 passes through a hole in the screwed top 28 and is secured therein, but said top and the fitting 29 are free to rotate independently. The fitting 29 and extension 31 are bored to receive a rod 32, the inner end of which rests on the plunger 11 while the outer end is acted upon by a lever 33, fulcrumed to the lever 27 at 34. The levers 27 and 33 are provided with handles and the arrangement is such, that, as the handles are pressed together, the rod 32 is forced downward carrying with it the plunger 11 and thereby assisting the spring 12. The fitting 10 can turn freely on the extension 31, 31 in order to bring the device correctly in register with the stoppers to be sealed.

Petrol tins are usually made with a neck which is inclined to the top of the tin, so that the top of the stopper is not parallel with the top of the tin. Advantage is taken of this fact to provide an incline 34 along which the stoppered tins are fed by gravity, or by an endless band, to the sealing device and there presented to said device, with the stopper lying in the correct horizontal plane for applying the seal. The sealing and the retraction of the sliding member is similar to that before described.

It will be seen that the projections on the stopper enter the recesses in the die, so that the device is correctly positioned with respect to the seal. Material to form the seal may be provided in the form of a strip or reel which may be mounted on the face of the device and interconnected with the moving parts of the same so that a sufficient length to form one seal is automatically fed forward at each operation and a knife or shears are provided, which are also interconnected in a similar manner so as to automatically cut off the required length, or the before-mentioned knife edged projections may serve to sever the requisite length. Such an arrangement is shown in Fig. 12 where a bracket 35 is formed in one with or connected to the cylindrical casing 10. Journaled in the bracket 35 is a reel 39 of sealing material 40 which passes between feed rollers 36 and 37 to a slot 38 in the guide 13. The spindle of the feed roller 37 is provided with a fixed pinion 37ª which meshes with a gear wheel 41 to which rotary motion is imparted in one direction by the one way or free wheel pinion 42, said latter pinion revolving idly in the reverse direction. A quadrant 43 is pivoted at 44 to the casing 10 and is provided with teeth 45 which mesh with the free wheel or oneway pinion 42. An extension 46 of the quadrant 43 lying in the path of one of the plunger projections 24 is adapted to be moved in one direction by said projection thereby actuating the quadrant one way, the quadrant being actuated in the reverse direction by a spring 47.

The quadrant is shown in full lines in Fig. 12 when in the downward position, that is to say, when it has been moved about the pivot 44, due to the end 46 being carried upward by the plunger projection 24 as said plunger is forced inwardly during the act of applying a seal. During this movement the wheel 42 has been turning idly without imparting motion to the wheel 41. The required length of seal is severed by the knives 21 after it has been applied to the stopper as before described. The neck of the stoppered tin is removed from the tool in the manner previously described, but as it is necessary to prevent the sealing strip feeding forward for a fresh seal until the stopper already sealed is entirely removed the quadrant is retained in the raised position by the lever 48 pivoted at 49 to the casing 11, which lever 48 is retained in position so that the top portion 48ᵃ supports the extension 46 of the quadrant by means of the member 50 pivotally connected thereto and bearing against the neck of the tin. The top and bottom edges of the free end of the member 50 are inclined so that when the stopper engages the same said member is readily forced outward against the pressure of a spring 51. Immediately the sealed stopper has left the device the member 50 is free to move inwardly thereby allowing the lever 48 to be rocked by the spring 51 into the position shown in dotted lines, clear of the extension 46 thereby leaving the same unsupported as the plunger 11 and extension 24 are then in their outer position. This allows the quadrant 43 to be drawn upward under the influence of the spring 47 which causes a strip of sealing material to be fed forward ready for the next sealing operation, a clear passage being formed for said strip. In order that the extension 46 may clear the lever 48 when the next stopper is inserted, the top part 48ᵃ is hinged to the main part by a rule joint so that it can yield when pushed outward by the extension 46 in the act of rising, a spring 48ᵇ acting to normally keep the extension in the operative position. By these means the sealing strip is automatically fed forward when the sealed stopper has been removed and the path is clear for the advancement of said strip.
It will be obvious that the invention may be applied to vessels formed of material other than metal, such as glass, earthenware or the like.

The seals will preferably be formed of soft metal or the like and when serrations or the like are formed on the rim the seals will preferably be forced into engagement so that said serrations pierce the seals and insure a good and certain engagement of the same.

It will be obvious that the seals may be applied without adjustment of the apparatus which applies the same to successive vessels in which the stoppers do not enter the neck for exactly the same amount or when rotated do not come to rest on the neck in exactly the same diametrically relative position. The seal so made will be equally effective in all positions.

What I claim is:—

1. Apparatus for use in sealing petrol tins and other stoppered vessels or containers provided with an under-cut recess of an inverted V-shape in cross-section comprising a casing, a plunger slidably mounted in said casing, a spiral spring tending to force said plunger toward the open end of the casing, a plurality of sprng controlled members slidably mounted at said open end and whose inner edges are shaped to grip the neck of the vessel, upstanding projections on the aforesaid slidably mounted member, said spiral spring being sufficiently strong to force the upstanding projections, together with the ends of the seal, into the undercut recess of inverted U-shape in cross-section and means for retracting the sliding members when the latter are depressed clear of the undercut recess, substantially as described.

2. Apparatus for use in sealing petrol tins and other stoppered vessels or containers provided with an under-cut recess of an inverted U-shape in cross-section comprising a casing, a plunger slidably mounted in said casing, a spiral spring tending to force said plunger toward the open end of the casing, a plurality of spring controlled members slidably mounted at said open end and whose inner edges are shaped to grip the neck of the vessel, upstanding projections having knife edges on the aforesaid slidably mounted members said spiral spring being sufficiently strong to force the upstanding projections, together with the ends of the seal into the undercut recess of inverted U-shape in cross-section, and means for retracting the sliding members when the latter are depressed clear of the undercut recess, substantially as described.

3. Apparatus for use in sealing petrol tins and other stoppered vessels or containers provided with an undercut recess of an inverted U-shape in cross-section comprising a casing, a plunger which is slidably mounted in said casing and whose outer end is shaped to receive the vessel stopper, a plurality of spring controlled members, slidably mounted at said open end, whose inner edges are shaped to grip the neck of the vessel, knife edged projections on the sliding member, a spring, against the pressure of which the plunger is forced into the casing in operation, said spring subsequently acting to force the upstanding projections together with the ends of the seal into the undercut recess of inverted U-shape in cross-section, means to limit the longitudinal movement of the plunger relative to the casing, said means positioning the plunger angularly when in the outward position but allowing of relative rotational movement when pushed into the casing, substantially as described.

4. Apparatus for use in sealing petrol tins and other stoppered vessels or containers provided with an under-cut recess of an inverted U-shape in cross-section comprising a casing, a plunger which is slidably mounted in said casing and whose outer end is shaped to receive the vessel stopper, a plurality of spring controlled members, slidably mounted at said open end, whose inner edges are shaped to grip the neck of the vessel, knife edged projections on the sliding member, a spring against the pressure of which the plunger is forced into the casing in operation, said spring subsequently acting to force the upstanding projections, together with the ends of the seal, into the undercut recess of inverted U-shape in cross-section, complemental projections and slots in the plunger and casing each of said slots having one vertical and one inclined edge, substantially as described.

5. Apparatus for use in sealing petrol tins and other stoppered vessels or containers provided with an under-cut recess of an inverted U-shape in cross-section comprising a casing, a plunger slidably mounted in said casing, a spiral spring tending to force said plunger toward the open end of the casing, a plurality of spring controlled members slidably mounted at said open end and whose inner edges are shaped to grip the neck of the vessel, upstanding projections having knife edges on the aforesaid slidably mounted members said spiral spring being sufficiently strong to force the upstanding projections, together with the ends of the seal into the undercut recess of inverted U-shape in cross section, and means for retracting the sliding members when the latter are depressed clear of the undercut recess, a continuous sealing ribbon in strip form, feed rolls on the casing interconnected with the moving parts and adapted to automatically feed the strip into position to form the seal, substantially as described.

In witness whereof I have hereunto set my hand in the presence of two witnesses.

HARRY WILDAY JOHNSON.

Witnesses:
WALTER GUNN,
F. J. MEREDITH.

Copies of this patent may be obtained for five cents each, by addressing the "Commissioner of Patents, Washington, D. C."